United States Patent [19]

Moon et al.

[11] Patent Number: 6,088,696
[45] Date of Patent: Jul. 11, 2000

[54] MAILING/FILING SYSTEM FOR CONGRUENTLY CATEGORIZING DIFFERENT TYPES OF ELECTRONIC MAIL RESOURCES RECEIVED THROUGH A MESSAGING SYSTEM

[75] Inventors: Billy G. Moon, Apex; Tammy A. Wooldridge, Raleigh; Manon A. Baratt, Cary, all of N.C.

[73] Assignee: Ericsson Inc., Research Triangle Park, N.C.

[21] Appl. No.: 08/940,090

[22] Filed: Sep. 29, 1997

[51] Int. Cl.[7] ................................................... G06F 17/30
[52] U.S. Cl. ................................... 707/10; 707/9; 707/1
[58] Field of Search ...................... 707/1, 9, 10; 395/680

[56] References Cited

U.S. PATENT DOCUMENTS

| | | | |
|---|---|---|---|
| 5,717,742 | 2/1998 | Hyde-Thomson | 379/88 |
| 5,734,901 | 3/1998 | Sidhu et al. | 395/680 |
| 5,778,367 | 9/1998 | Wesinger, Jr. et al. | 707/10 |
| 5,796,404 | 8/1998 | Gentner | 345/352 |
| 5,809,242 | 9/1998 | Shaw et al. | 395/200.47 |
| 5,819,271 | 10/1998 | Mahoney et al. | 707/9 |
| 5,826,252 | 10/1998 | Wolters, Jr. et al. | 707/1 |
| 5,889,518 | 3/1999 | Poreh et al. | 345/340 |

OTHER PUBLICATIONS

Microsoft Corporation, "Microsoft Mail Electronic Mail for PC Networks Workstation Software for Windows and Presentation Manager Version 3.0", 1992.

Steven J. Vaughan–Nichols, "Eudorable Web Mail", (Qualcomm's Eudora Pro for Windows 3.0 32–bit e–mail client), Computer Select, p 140, Feb. 1997.

Ronni T. Marshak, "FileNet Releases Ensemble For Ad Hoc E–Mail–Based Workflow", Computer Select, The Workgroup Computing Report, v20, p33, Jan. 1997.

Charlotte Ziems et al., "Notes Wins The First Bout", (Lotus Notes 4.1, Netscape's SuiteSpot and Microsoft Exchange Server 4.0 Work Software) (includes product features table and related articles on test results, Lotus' Domino 4.5 Server software and testi, Feb. 1997.

*Primary Examiner*—John E. Breene
*Assistant Examiner*—Cheryl Lewis
*Attorney, Agent, or Firm*—Wood, Phillips, VanSanten, Clark & Mortimer

[57] ABSTRACT

A user operating system is provided for use in a user communications device having a processor controlling a display and a user input device, the processor operating plural application programs each using data files formatted to the particular application program, and a communications terminal for sending and receiving a plurality of different types of electronic mail including such formatted data files. The user operating system includes a messaging application operating in the processor for congruently categorizing electronic mail received at the user communications device based upon the type of electronic mail received. A mail module is operated by the processor to send and receive electronic mail via the communications terminal. A file module, operably associated with the mail module, defines plural directories for storing data files, the data files in any such directory being of a preselect format, and directly stores electronic mail received by the mail module as data files in select ones of the directories based upon the type of electronic mail received.

24 Claims, 10 Drawing Sheets

6,088,696

MAILING/FILING SYSTEM FOR CONGRUENTLY CATEGORIZING DIFFERENT TYPES OF ELECTRONIC MAIL RESOURCES RECEIVED THROUGH A MESSAGING SYSTEM

FIELD OF THE INVENTION

The present invention is directed toward electronic mail and, more particularly, to a mailing system which doubles as a filing system for congruently categorizing electronic mail received at a user communications device and directly storing the received electronic mail in an appropriate directory.

BACKGROUND OF THE INVENTION

Communications via electronic mail resources are becoming more and more common. In order to receive and/or transmit electronic mail using such resources, a user installs mail application software on a personal computer or other communications device. Traditional mail applications do not automatically place the incoming mail in an application useful directory or mailbox. The traditional mail application simply recognizes the incoming parcel as mail and stores it at a pre-chosen location with no regard to type.

With traditional mail applications, a user must first run the mail application or mail client to retrieve the incoming mail. After the mail is retrieved, the user then must save the incoming mail parcel as a particular file type within a particular directory. Depending on the type of electronic mail, the user must exit the mail application, open to the desired application and access the saved file while in the desired application to view the mail parcel.

Further, once mail is received and placed in an appropriate file, its attachments and send or receive headers are lost.

Still further, in today's hectic business world it is helpful to a business person to not only keep a log of calls made, but also either record or take notes during the conversation and associate them with the particular call. Traditional logs only include the name and number with whom the business person has had a conversation. If the business person wishes to take notes during the call, he/she must do so manually using a separate application.

The present invention is directed toward overcoming one or more of the above-mentioned problems.

SUMMARY OF THE INVENTION

A user operating system is provided for use in a user communications device having a processor controlling a display and a user input device, the processor operating plural application programs each using data files formatted to the particular application program, and a communications terminal for sending and receiving a plurality of different types of electronic mail including such formatted data files. The user operating system includes a messaging application operating in the processor for congruently categorizing electronic mail received at the user communications device based upon the type of electronic mail received. A mail module is operated by the processor to send and receive electronic mail via the communications terminal. A file module is operably associated with the mail module. The file module defines plural directories for storing data files, the data files in any such directory being of a preselect format. The file module directly stores received electronic mail as data files in select directories based upon the type of electronic mail received.

In one aspect of the present invention, the type of incoming electronic mail is selected from the group consisting of fax, voice, E-mail, scenery, business card, MIME, HTML, and attachment.

In another aspect of the present invention, a default directory, operably associated with the file module, is provided for receiving electronic mail of an unidentifiable type from the file module.

In another aspect of the present invention, the file module is operable to determine the type of electronic mail received at the user communications device.

In another aspect of the present invention, each of the plurality of different types of electronic mail has a unique format. The file module is operable to determine the format of the electronic mail received at the user communications device and to directly store the received electronic mail as data files in select directories based upon the format of the received electronic mail.

In another aspect of the present invention, the electronic mail stored as data files in select directories are accessible by select application programs using appropriately formatted data files.

In another aspect of the present invention, the messaging application further includes an edit module operably associated with the file and mail modules, the edit module being operable to permit editing of the electronic mail received and stored as data files.

In another aspect of the present invention, the edit module includes editing features such as cut, copy, and paste features, whereby a user of the user communications device can copy or move data files to different directories within the messaging application.

In another aspect of the present invention, the communications terminal is adapted to initiate voice communications. The user operating system further includes a phone application installable in the processor for keeping a log of voice phone calls made by a user of the user communications device. The phone application includes a history list module operated by the processor to keep a log of all voice phone calls made by the user via the voice communications application, and an audio module operatively associated with the history list and activatable by the user during a voice phone call. The audio module records the voice phone call, whereby the recorded voice phone call can be replayed by the user at a later time.

In another aspect of the present invention, the audio module provides a notification icon in the history list that the particular voice phone call has been recorded.

In another aspect of the present invention, the phone application further includes a text note module operatively associated with the history list and activatable by the user during a phone call. The text note module permits the user to manually input textual notes during the phone call via the user input device.

In still another aspect of the present invention, the text note module provides a notification icon in the history list that the particular phone call has an associated textual note.

In yet another aspect of the present invention, the history list includes a name and number associated with each voice phone call made by the user.

It is an object of the present invention to provide a mail application capable of doubling as a file application.

It is a further object of the present invention to enable a user of the user communications device to utilize editing features such as cut, copy, and paste to manipulate mail messages and attachments within the file system.

It is still a further object of the present invention to provide a mail application which recognizes the type of electronic mail resource received and stores the received electronic mail resource as a data file in a select directory.

It is yet another object of the present invention to provide a user with the capability of associating telephone call details with the text and voice notes taken during the telephone call and to send and/or receive these call history records as E-mail.

Other aspects, objects and advantages of the present invention can be obtained from study of the application, the drawings, and the appended claims.

DETAILED DESCRIPTION OF THE PREFERRED EMBODIMENT

Figure 1:
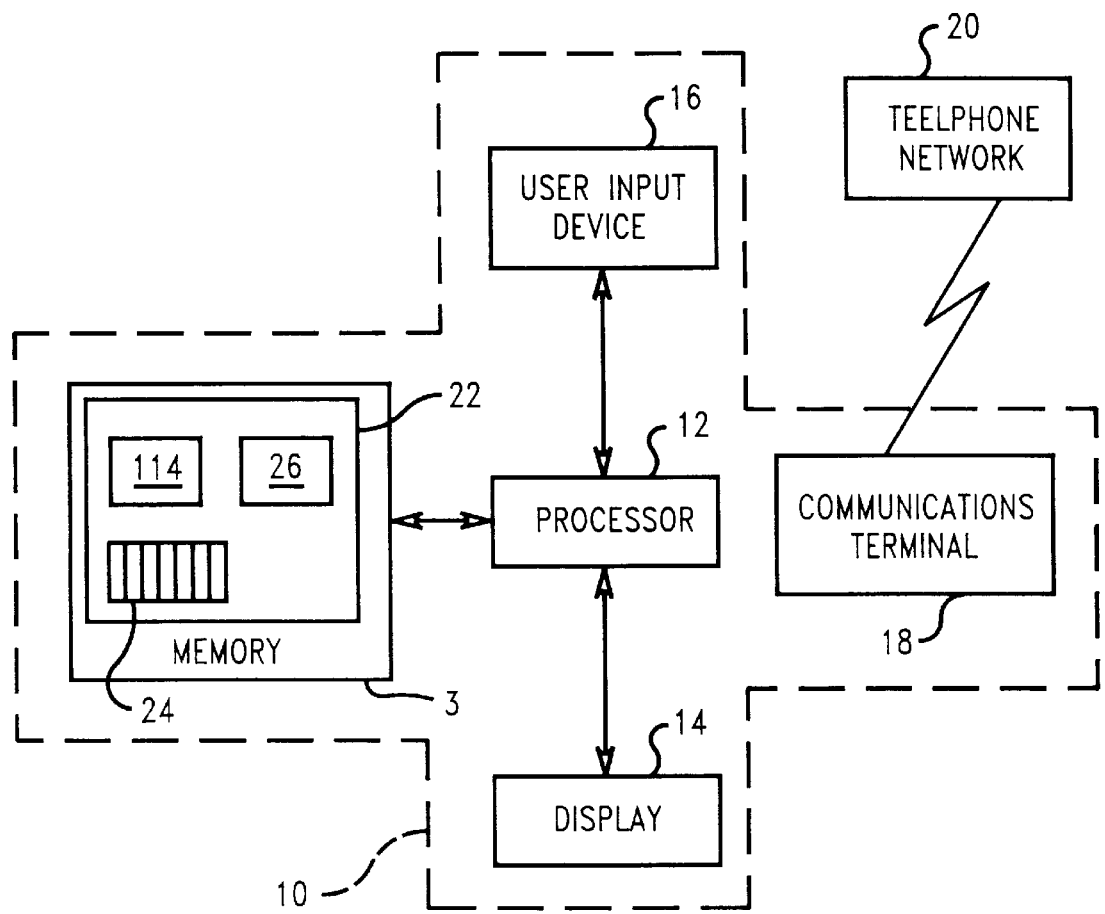
FIG. 1 is a block diagram of a user communications device operated by the user operating system of the present invention.

A user intelligent communications device is depicted generally at 10 in FIG. 1. The user communications device 10 includes a processor 12 connected to an associated memory 13. The processor 12 controls a display 14 and receives input commands from a user input device 16. The user communications device 10 also includes a communications terminal 18 for transmitting and receiving a plurality of different types of electronic resource messages via a telephone network 20. The communications terminal 18 may also be used as a phone dialer for initiating voice communications. The terminal 18 may be, for example, a cellular phone having an integral cellular modem. The telephone network 20 is preferably a cellular network, however, the present invention also contemplates use with a Public Switch Telephone Network ("PSTN").

A user operating system 22 in the form of a suite of application programs is provided in the memory 13. The user operating system 22 includes a plurality of application programs, shown generally at 24, the plurality of application programs using data files stored in formats applicable to the particular application program 24. Such application programs 24 may include, but are not limited to, such application programs as word processing, spreadsheet, and graphics.

A messaging application 26 is also included in the user operating system 22, the messaging application 26 congruently categorizing electronic mail and data files, and directly storing the electronic mail received by the user communications device 10 as data files in select "mailboxes" or directories depending upon the type of electronic mail resource received at the user communications device 10.

Figure 2:
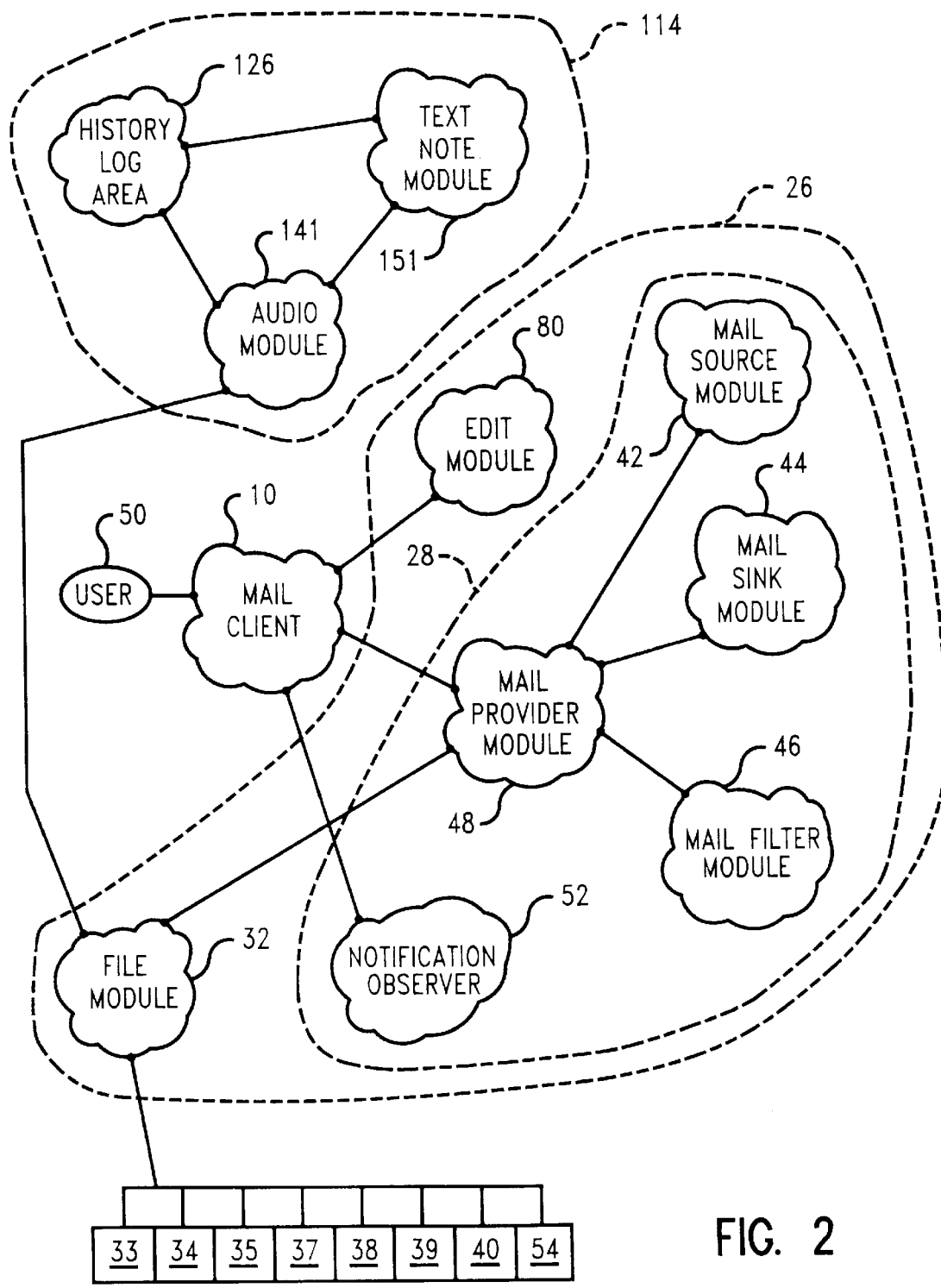
FIG. 2 is a block diagram of the messaging and phone applications included in the user operating system of the present invention.

As shown more particularly in FIG. 2, the device 10 is referred to as a "mail client" and includes a graphic user interface (GUI) to provide control panels, menus and the like for the display 14 for entering input information on the user input device. The messaging application 26 includes a mail module 28 for sending and receiving electronic mail to and from an external network, such as the Internet, via the communications terminal 18. A file module 32 receives incoming electronic mail from the mail module 28 and directly stores the received electronic mail in "mailboxes" or directories 33–40, depending on the type or format of the received electronic mail.

The mail module 28 includes conventional mail source 42, mail sink 44, mail filter 46, and mail provider 48 modules for receipt and transmission of electronic mail resources by the mail module 28.

Figure 3:
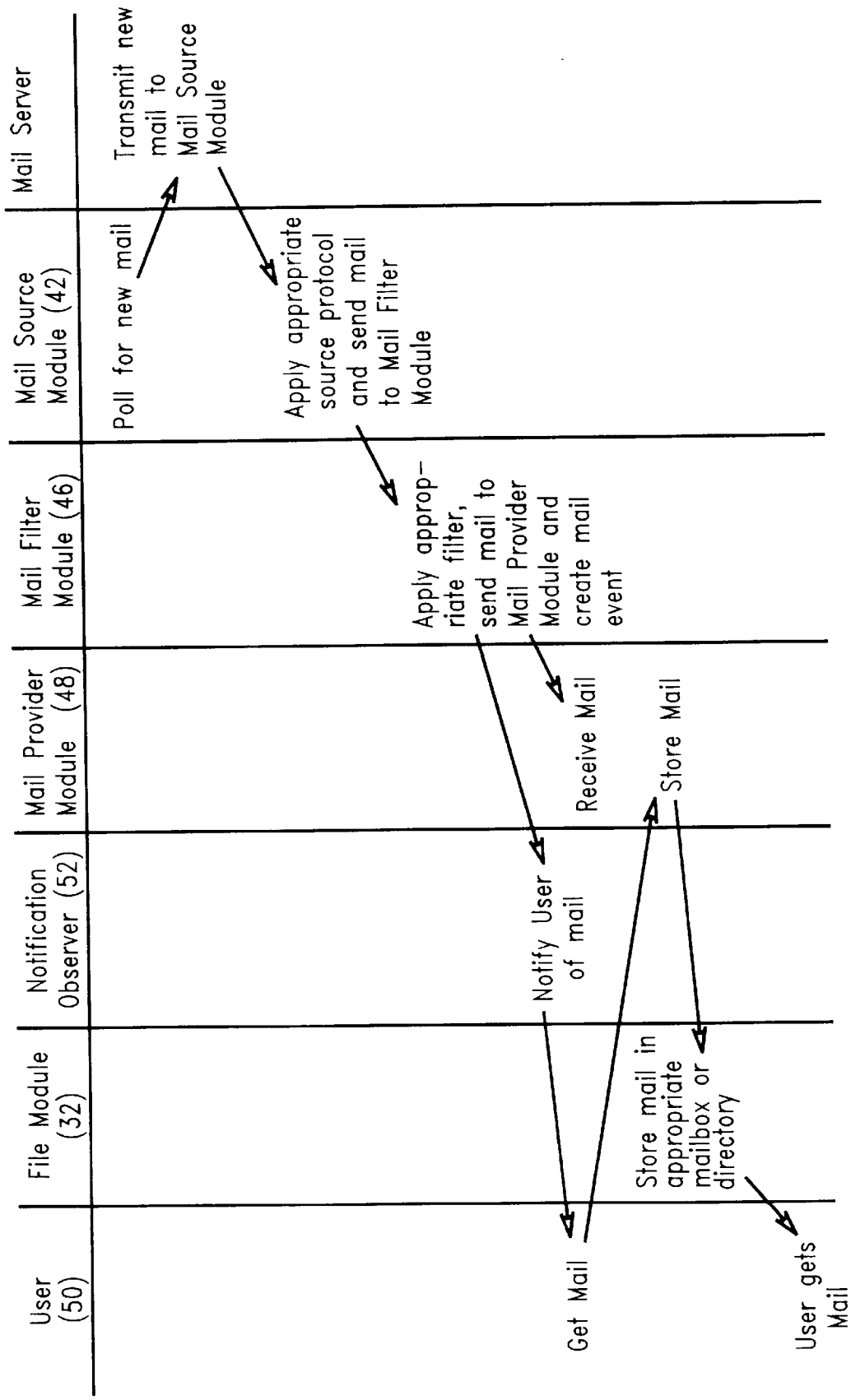
FIG. 3 is a process flow diagram illustrating the method by which the messaging application receives electronic mail resources at the user communications device.

Referring now to FIGS. 2 and 3, the receipt of electronic mail resources by the messaging application 26 is as follows. The mail client 10 is operated by a user 50. The mail client 10 may be conventionally programmed to periodically poll mail servers, located in the external network, of the mail service providers with which the user 50 has an account for new mail. If new mail destined to the user 50 has been received at the mail server, the mail source module 42 conventionally retrieves the new mail from the mail server and applies the appropriate source protocol to the incoming electronic mail resource. The incoming mail is routed to the mail filter module 46, which applies the appropriate filter, if any, to the incoming mail parcel. The incoming mail is routed to the mail provider module 48 and the user 50 is conventionally notified, via the notification observer 52, that new mail has been received.

The mail provider module 48 sends the incoming mail parcel to the file module 32, which analyzes the incoming mail parcel and stores it as a data file in an appropriate directory 33–40. The file module 32 is capable of recognizing various types of incoming mail parcels such as, but not limited to, fax, voice, E-mail, scenery, business card, MIME, HTML, or attachment. The attachment may be, for example, a word processing data file or spreadsheet data file. The file module 32 upon recognizing the type of parcel automatically names and places the incoming mail parcel into an appropriate "mailbox" or directory 33–40 which can be immediately utilized by the corresponding application 24, see FIG. 1, which uses documents or parcels of that type. The user 50, upon receiving notification, is then able to access the mail parcel in the appropriate directory 33–40 using its associated application 24.

Generally, the file module 32 analyzes the incoming mail parcel and determines the type of incoming mail parcel by the suffix in its file name, or information in the E-mail header. If for whatever reasons, the file module 32 cannot determine the type of incoming mail parcel, the file module 32 sends the incoming mail parcel to a general default mailbox or directory 54. Incoming mail parcels in the general directory 54 can be accessed by a user in a conventional manner and saved as any type desired.

Figure 4:
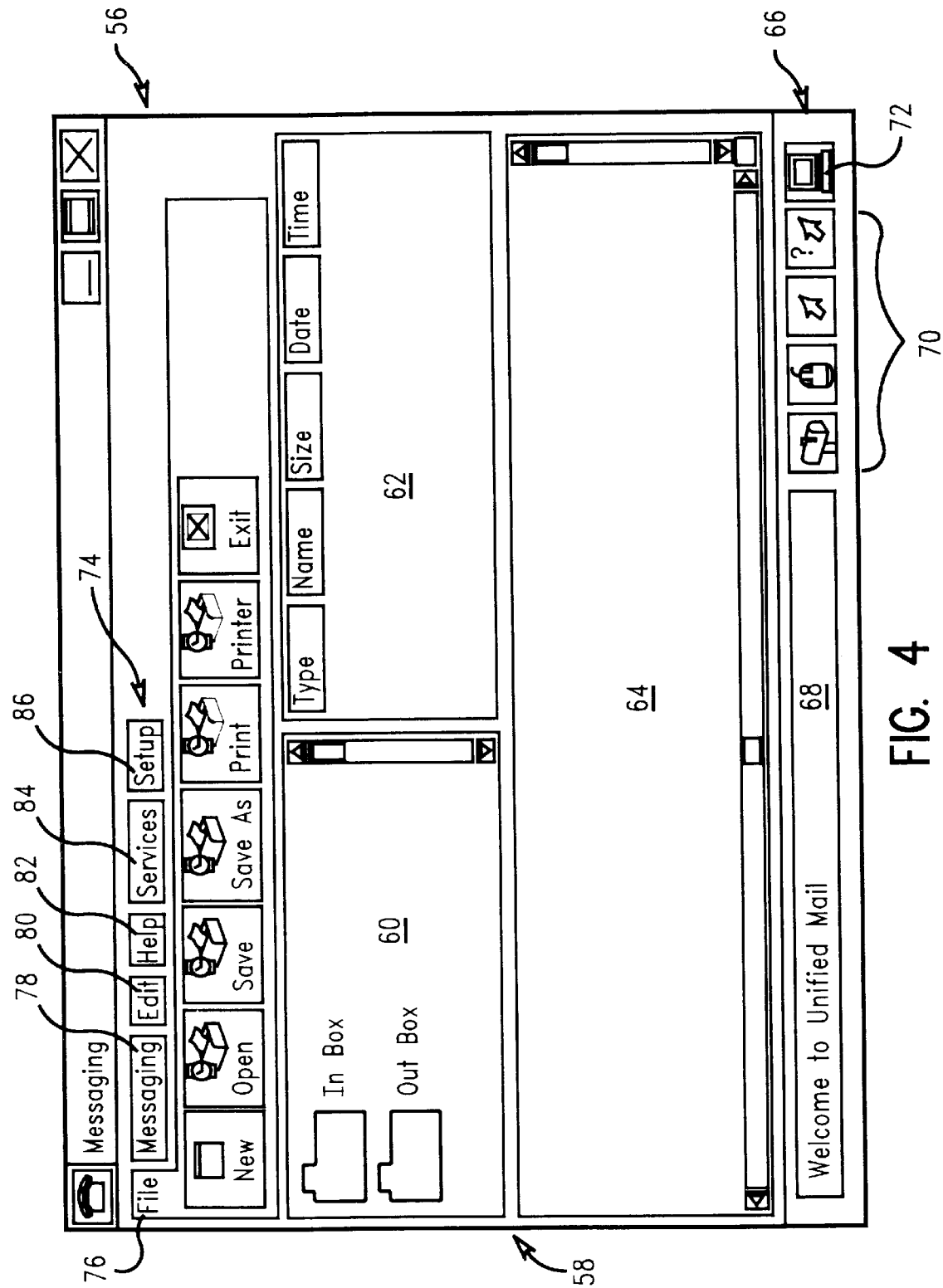
FIG. 4 is a screen shot of the messaging application of the present invention.

A screen shot of the messaging application 26 is shown in FIG. 4. The messaging application includes a control area 56 and a work area 58. The work area 58 in the messaging application 26 is partitioned into three areas which can be re-sized by the user 50. The top left area 60 is a forest or tree view of the directories and the mail and/or files contained within. The top right area 62 is a view of the contents of the directories or mail items selected in the forest view 60. The bottom area 64 contains an expanded view of the mail parcel selected in the list or forest view 60. Below the work area 58 is a status bar area 66. The status bar area 66 contains an area for relaying help or error messages 68, an area for meters 70, and a mouse mode panel 72. Notifications for receiving mail could be viewed as an icon or a message appearing in the status bar area 66, depending on the user's preference.

The messaging application 26 of the present invention also doubles as a file manager application allowing the user 50 to edit or update an incoming mail parcel. Thus, the messaging application 26 of the present invention gives the user 50 the flexibility of directly manipulating mail messages and attachments through the use of a clipboard or other editing feature without launching a separate application.

The control panel 56 includes a control button menu 74 for accessing the file 76, mail 78, edit 80, help 82, services 84, and set-up 86 modules.

Figure 5:
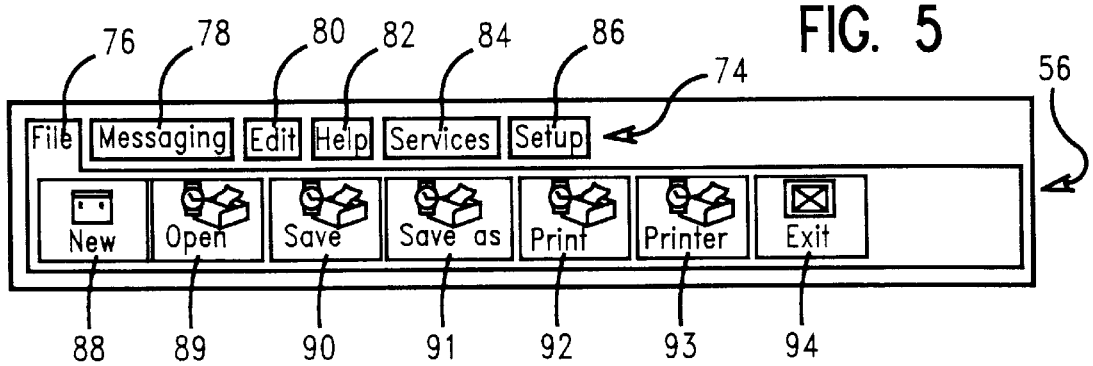
FIG. 5 is a screen shot of the control button area of the messaging application of the present invention with the file module activated.

FIG. 5 depicts a view of the control area 56 with the file module 76 activated. From the file module 76, the user 50 has access to the following buttons: NEW 88, OPEN 89, SAVE 90, SAVE AS 91, PRINT 92, PRINTER 93, and EXIT 94. The buttons 88–94 behave in much the same way as the traditional buttons. However, PRINTER 93, which is not one of the traditional buttons, allows the user 50 to configure an attached printer.

Figure 6:
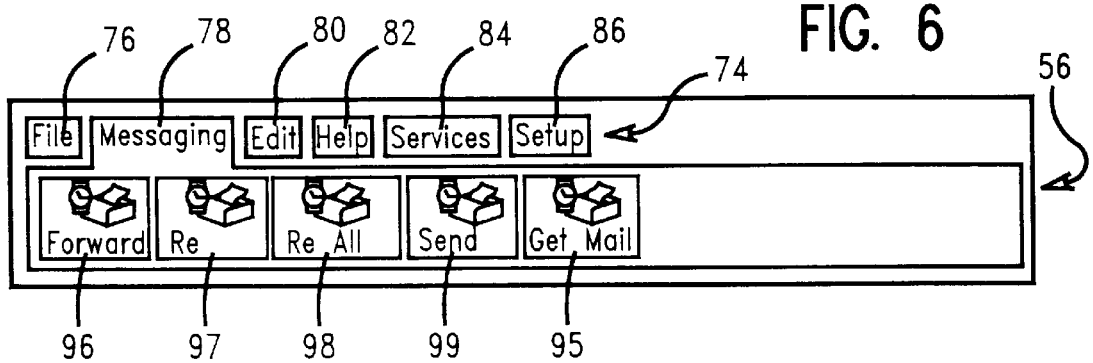
FIG. 6 is a screen shot of the control button area of the messaging application of the present invention with the mail module activated.

FIG. 6 depicts a view of the control area 56 with the mail module 78 activated. From the mail module 78, the user 50 has access to the following buttons: GET MAIL 95, FORWARD 96, REPLY 97, REPLY TO ALL 98, and SEND 99. The functions of these buttons 95–99 follow the traditional interpretation of mail applications.

Figure 7:
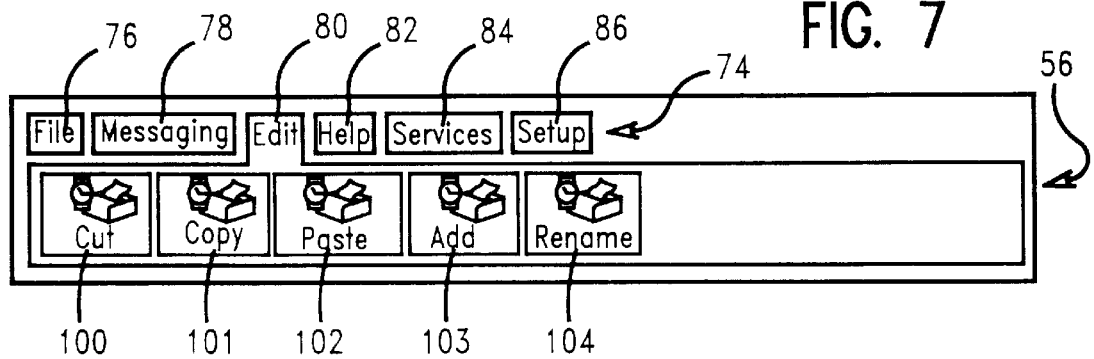
FIG. 7 is a screen shot of the control button area of the messaging application of the present invention with the edit module activated.

FIG. 7 depicts a view of the control area 56 with the edit module 80 activated. From the edit module 80, the user 50 has access to the following buttons: CUT 100, COPY 101, PASTE 102, ADD 103, and RENAME 104. These editing functions allow the user 50 to manipulate directory files and mail messages. CUT 100, COPY 101, and PASTE 102 manipulate the files and mail messages by behaving as traditional edit functions using the traditional clipboard. The ADD 103 function is used to add new directories. RENAME 104 is used to rename a directory, file or mail message.

The CUT 100, COPY 101 and PASTE 102 features can work on mail "messages" as well as their content depending on the context. For example, if an attachment of a file is highlighted in the forest view 60, it can be cut and/or copied and pasted into another file as an attachment or into a folder as a view file.

The help 82, services 84 and setup 86 modules behave in the same manner as traditional applications, and are not discussed in detail.

Figure 8:
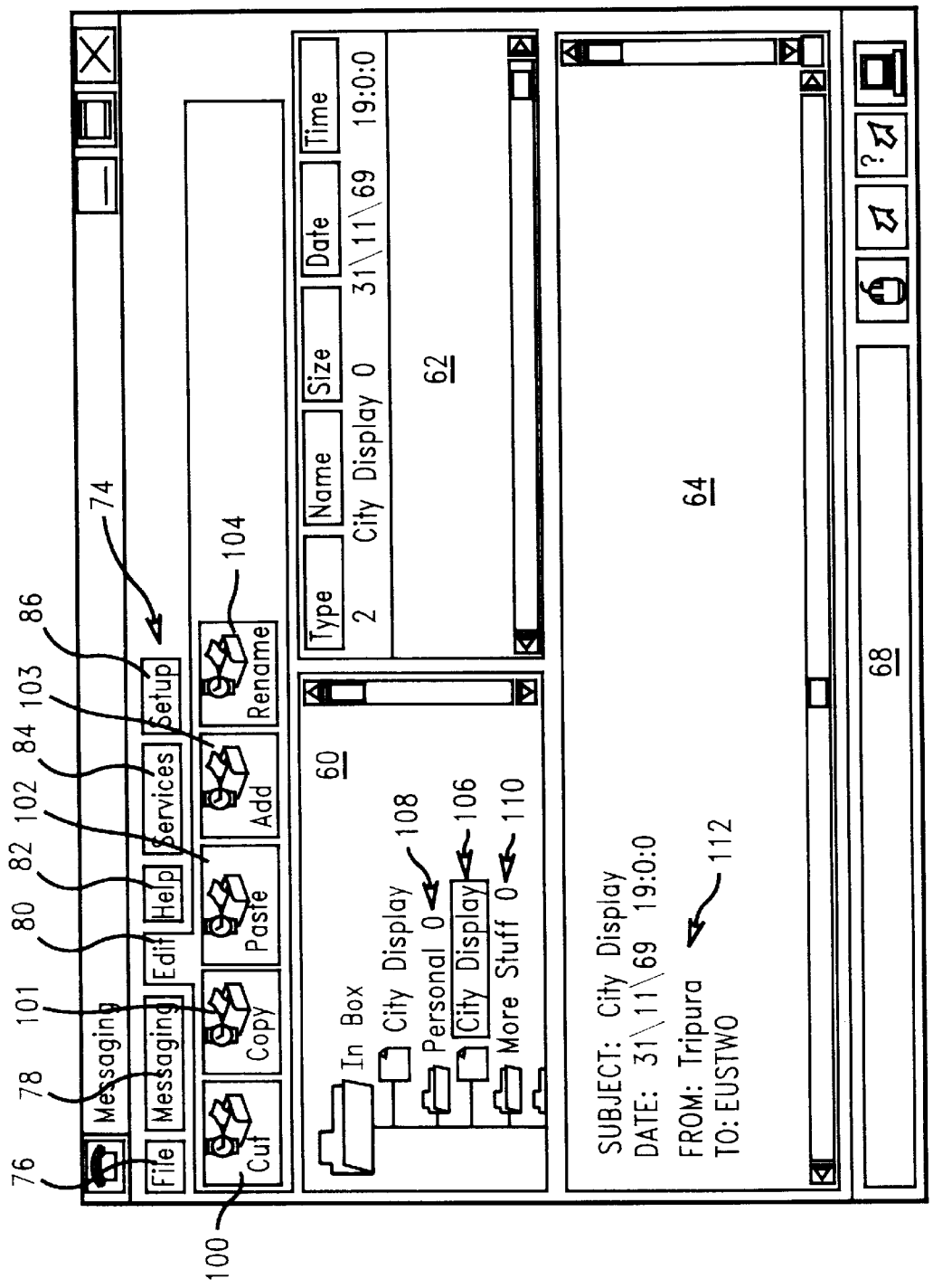
FIG. 8 is a screen shot of the messaging application of the present invention illustrating the editing features included in the edit module just prior to cutting the highlighted file to the clipboard.
Figure 9:
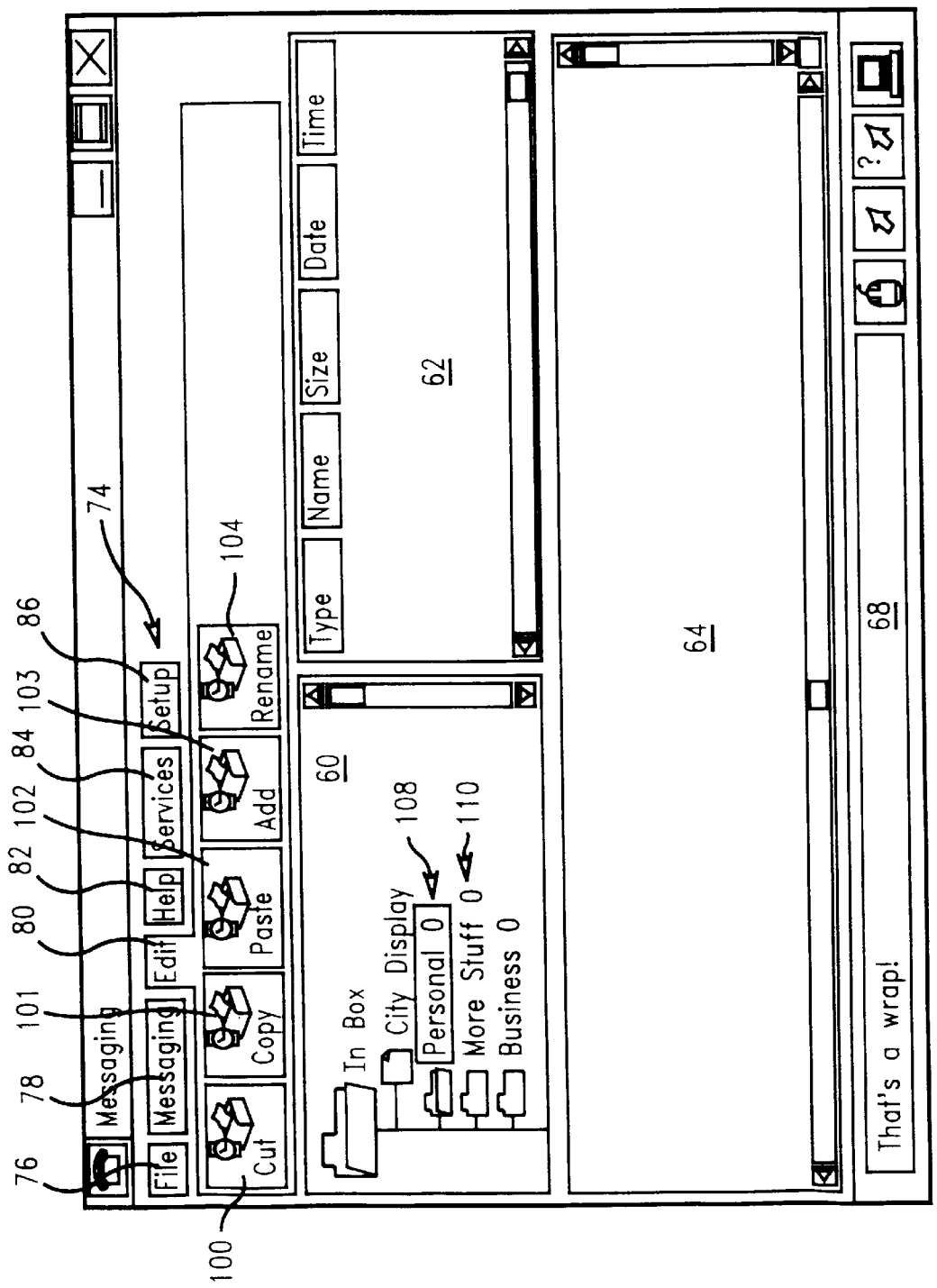
FIG. 9 is a screen shot of the messaging application of the present invention illustrating the editing features included in the edit module after the highlighted message has been cut to the clipboard.
Figure 10:
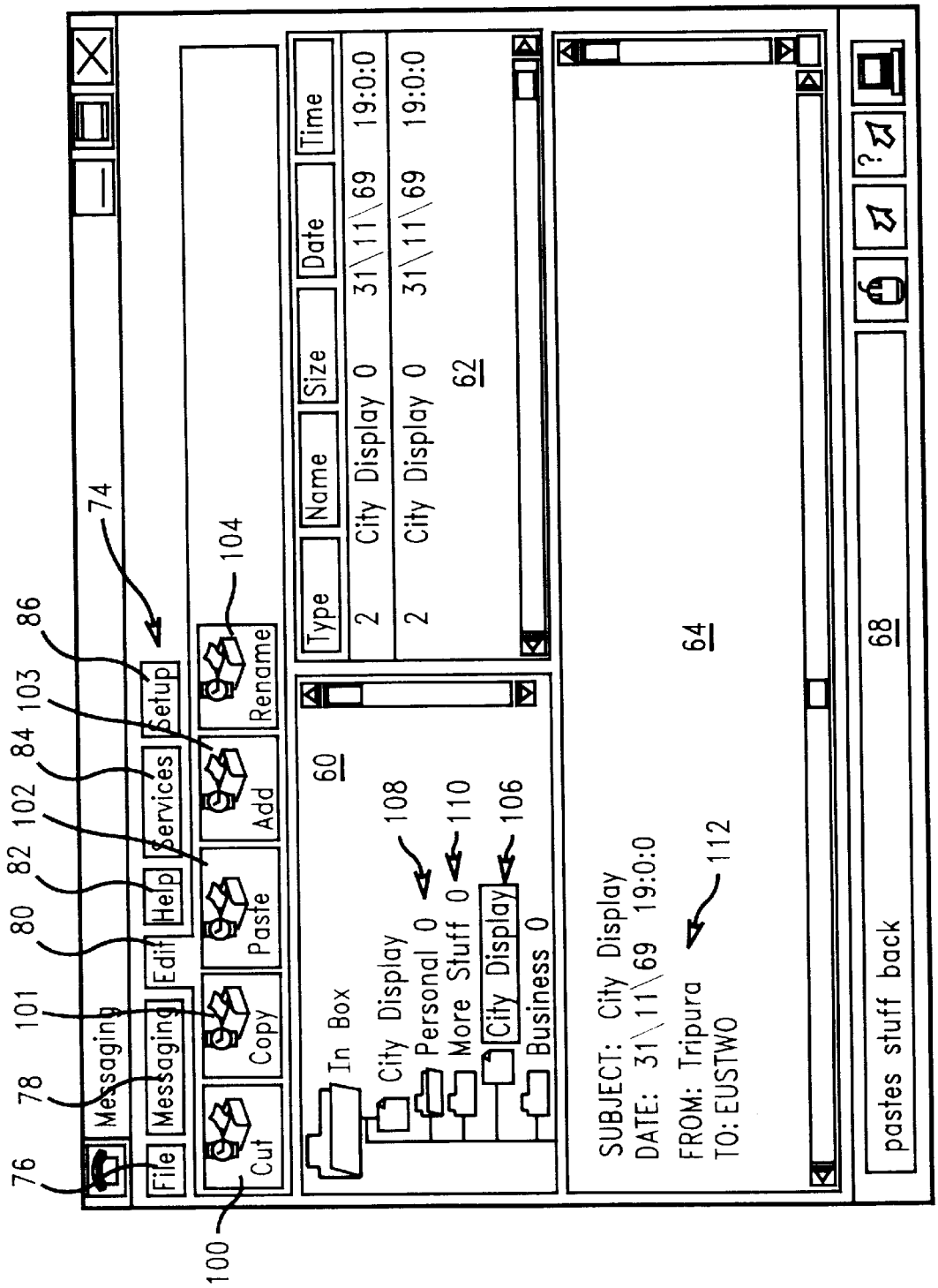
FIG. 10 is a screen shot of the messaging application of the present invention illustrating the editing features included in the edit module after the highlighted message has been pasted from the clipboard to a different directory.

FIGS. 8–10 depict a cut and paste scenario using the editing features. More specifically, FIGS. 8–10 depict moving the mail message or file "City Display" 106 from the "Personal0" directory 108 to the "More Stuff0" directory 110.

FIG. 8 depicts a screen shot of the display 14 prior to a cut of the highlighted mail message "City Display" 106, the header of which is shown at 112. After highlighting the mail message, a user clicks on the cut button 100 to cut and deposit the mail message "City Display" 106 on the clipboard. FIG. 9 depicts a screen shot of the display 14 after the mail message "City Display" 106 has been cut. The user 50 then highlights the directory "More Stuff0" 110 and clicks on the paste button 102. FIG. 10 depicts a screen shot of the display 14 after the pasting of the mail message "City Display" 106 to the directory "More Stuff0" 110. Similar to the previously described cut and paste scenario, the copy and paste scenario works in much the same way except that the mail message would be copied to the clipboard, via the copy button 101, without being cut.

While other editing features such as ADD 103 and RENAME 104 are also included in the editing features of the present invention, the present invention is by no means meant to be limited to the editing features illustrated in FIGS. 8–10, and other editing features may be included without departing from the spirit and scope of the present invention.

During the course of a business day, or a business trip if a business person is on the road, the business person normally makes numerous telephone calls. It is helpful to a business person to keep a log of calls made. Accordingly, the user communications device 10 of the present invention is provided with a phone application 114 included in the user operating system 22. The phone application 114 permits the user 50 to dial phone calls using the communications terminal 18.

Figure 11:
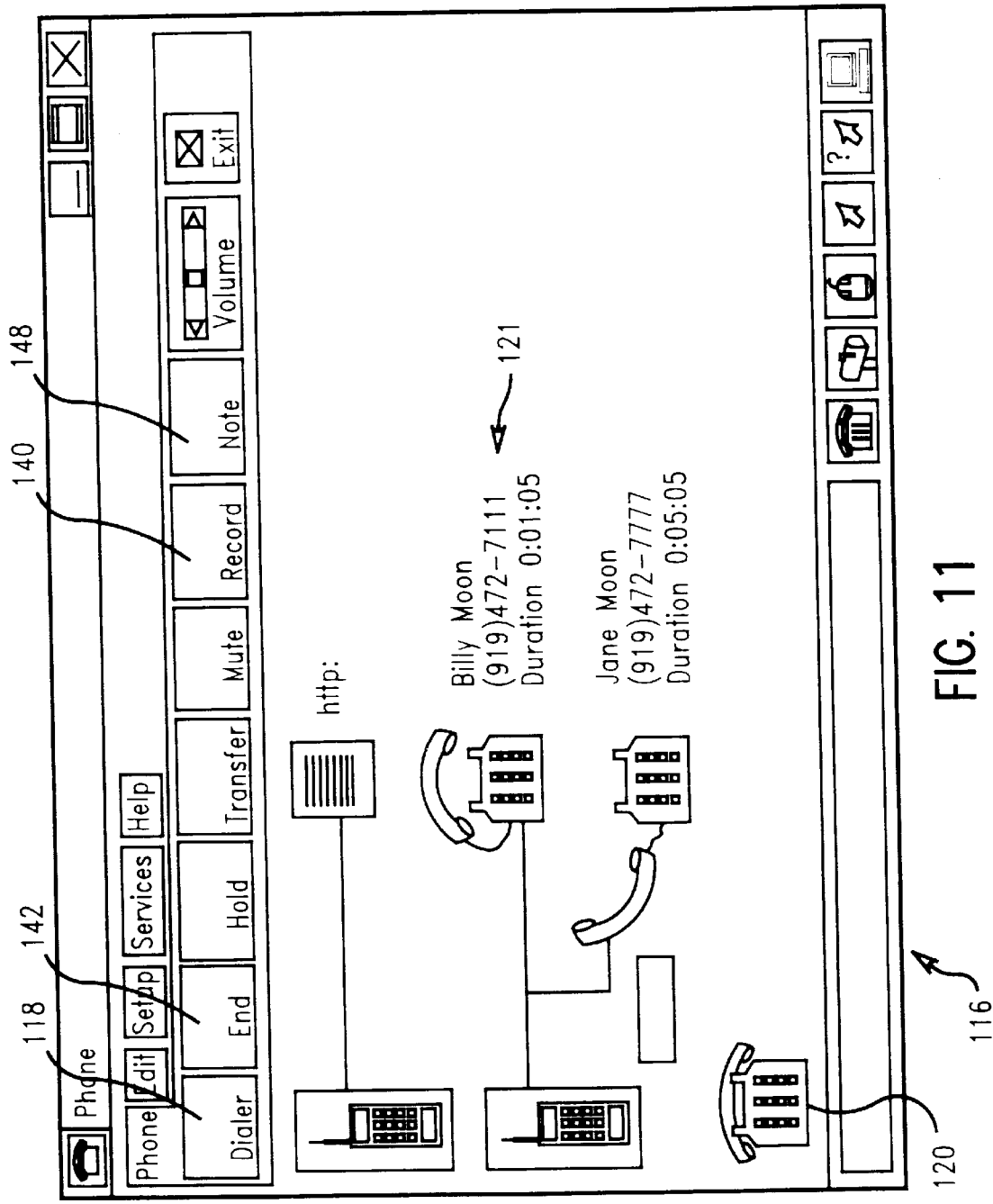
FIG. 11 is a screen shot of the dialer screen of the phone application of the present invention.

The main screen for the phone application 114 is shown generally at 116 in FIG. 11. The user 50 can dial from the phone main screen 116 or any other application where the dialer 118 control button appears by highlighting a person's name or a number, selecting a phone by clicking on the phone icon 120 (if a phone is not selected, the phone application 114 will choose a phone), and then pressing the dialer 118 control button.

Upon activation of the dialer 118 control button, the phone application 114 searches through its phone book database to find the business card for the number being called. Once found, the numbers with their associated time ranges in the business card are checked against the number being called and time of call. If the number entered is not the right one, the appropriate number will be picked from the business card and used to place the call. The main screen 116 for the phone application 114 displays generally at 121 the currently installed phones in the phone application 114 with the latest status (off-hook, on-hook, on-hold, etc.), together with callers/called name and number and form of the call (voice, data, fax).

Figure 12:
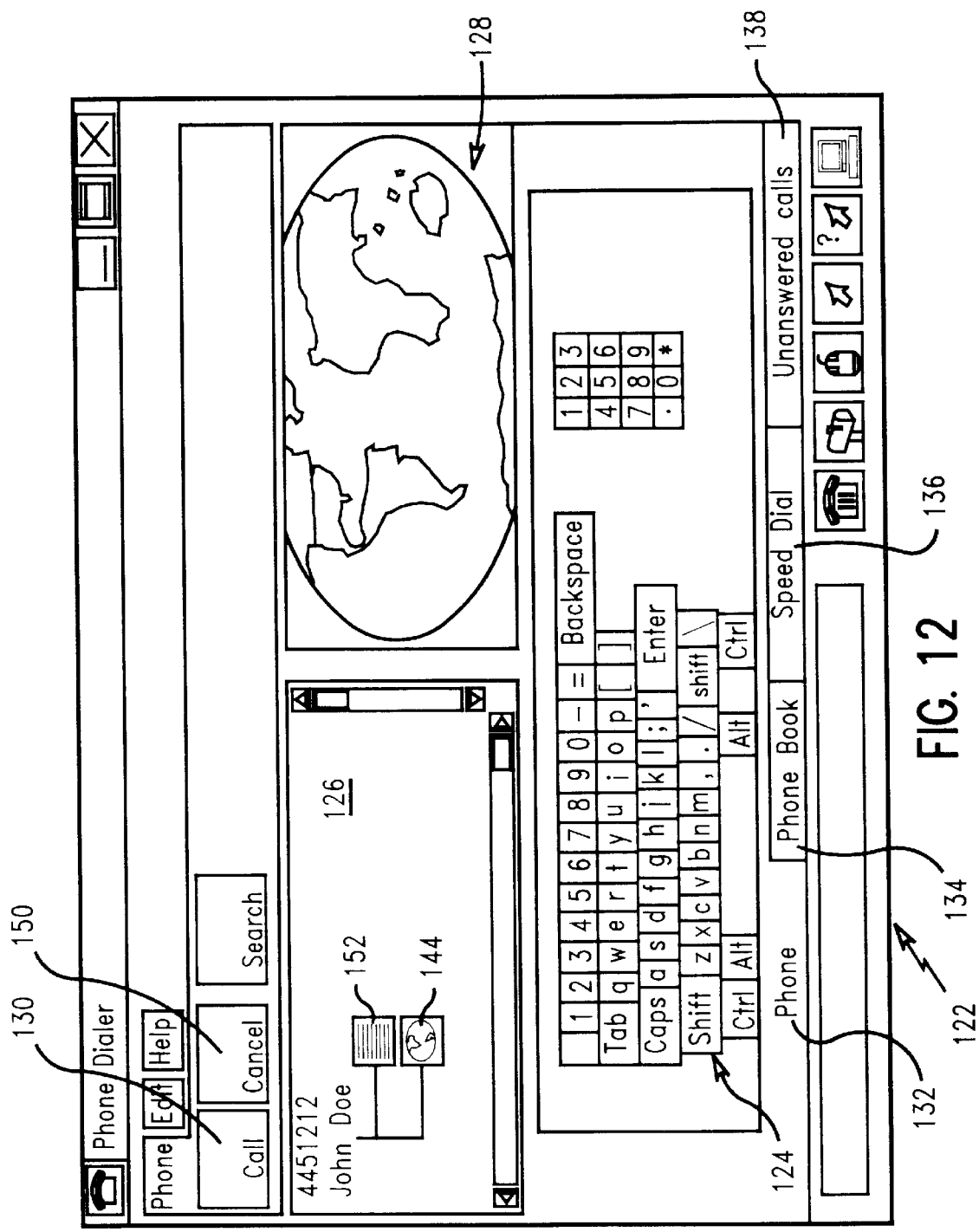
FIG. 12 is a screen shot of the dialog screen of the phone application of the present invention.

Activating the dialer 118 control button brings up the dialer screen shown generally at 122 in FIG. 12. The dialer screen 122 includes a full telephony keyboard 124 together with a history log area 126 where the previous call information has been stored and an image of the globe 128 used to extract area codes and time zones for different parts of the world. From the dialer screen 122, the user 50 can press the CALL button 130 to make the call. If no number or name is entered at the dialer screen 116, the dialer screen 122 gives the user the ability to pick a number or name from any of the four tabbed panels: phone dialer 132, phone book 134, speed dialer 136, or unanswered calls 138. Preferably, the phone application has a call time-out-timer which will terminate a call beyond the allotted time, the allotted time being modifiable by the user 50.

Once the call is placed, the screen of FIG. 11 will be displayed on the display 14. While the user 50 of the user communications device 10 is on the phone, a need may arise to record the conversation and/or take notes related to the phone call. These notes can then be played back at a later time. From the main screen 116 of FIG. 11, clicking on the record button 140 starts recording of the conversation via an audio application or module 141. The phone call will be recorded in a voice file in one of the directories 33–40. Once the user 50 is finished with recording, pressing the end button 142 will terminate the recording function and add voice note icon 144 to the call in the history area 126 indicating that voice notes were taken during the call.

The user 50 can also take textual notes during the call by pressing the note button 148 in FIG. 11, which activates a text note application or module 151 and brings up a text note window on the display 14. The user can then type in any notes taken during the conversation using the user input device 16 or full telephony keyboard 124. The note is stored in a text file in one of the directories 33–40. When the user is finished with the note, pressing the cancel button 150 terminates the note taking and adds text note icon 152 to the call in the history list area 126 indicating that a text note was taken during the call.

The user 50 can access either the text notes taken during the call or the recording of the call by clicking on the appropriate icon 152 or 144 in the history list area 126.

While the invention has been described with particular reference to the drawings, it should be understood that various modification can be made without departing from the spirit and scope of the present invention.

What is claimed is:

1. In a user communications device having a processor controlling a display and a user input device, the processor operating plural application programs each using data files formatted to the particular application program, and a communications terminal for sending and receiving a plurality of different types of electronic mail including such formatted data files, a user operating system comprising:
   a messaging application operating in the processor for congruently categorizing electronic mail received at the user communications device based upon the type of electronic mail received, the messaging application including
      a mail module operable to send and receive electronic mail via the communications terminal, and
      a file module operably associated with the mail module, the file module defining plural directories for storing data files, the data files in any such directory being of a preselect format, the file module directly storing electronic mail received by the mail module as data files in select ones of said directories based upon the type of electronic mail received.

2. The user operating system of claim 1, wherein the type of incoming electronic mail is selected from the group consisting of fax, voice, E-mail, scenery, business card, MIME, HTML and attachment.

3. The user operating system of claim 1, further including a default directory operably associated with the file module, the default directory receiving electronic mail of an unidentifiable type from the file module.

4. The user operating system of claim 1, wherein the file module is operable to determine the type of electronic mail received at the user communications device.

5. The user operating system of claim 4, wherein electronic mail received at the user communications device includes a title having a suffix generally indicative of the type of electronic mail, the mail module operable to determine the type of received electronic mail by its suffix.

6. The user operating system of claim 1, wherein each of the plurality of different types of electronic mail has a unique format, the mail module operable to determine the format of the electronic mail received at the user communications device and directly store the received electronic mail as data files in select directories based upon the format of the received electronic mail.

7. The user operating system of claim 6, wherein the electronic mail stored as data files in select directories are accessible by select application programs using appropriately formatted data files.

8. The user operating system of claim 1, the messaging application further including an edit module operably associated with the file module and mail module, the edit module operable to permit editing of the electronic mail received and stored as data files.

9. The user operating system of claim 8, wherein the edit module includes cut, copy and paste editing features, whereby a user of the user communications device can copy or move data files to different directories within the messaging application.

10. The user operating system of claim 1, wherein the communications terminal is adapted to initiate voice communications, the user operating system further comprising a phone application installable in the processor for keeping a log of voice phone calls made by a user of the user communications device, the phone application including:
   a history list module operated by the processor to keep a log of all voice phone calls made by the user and displaying the log on the display; and
   an audio module operatively associated with the history list and activatable by the user during a voice phone call, the audio module recording the voice phone call.

11. The user operating system of claim 10, wherein the audio module provides a notification icon in the history list that the particular voice phone call has been recorded.

12. The user operating system of claim 10, wherein the phone application further includes a text note module operatively associated with the history list and activatable by the user during a voice phone call, the text note module permitting the user to manually input textual notes during the voice phone call via the user input device.

13. The user operating system of claim 12, wherein the text note module provides a notification icon in the history list that the particular voice phone call has an associated textual note.

14. The user operating system of claim 10, wherein the history list includes a name and number associated with each voice phone call made by the user.

15. In a user communications device having a processor controlling a display and user input device, the processor operating plural application programs each using data files formatted to the particular application program, and a communications terminal for sending and receiving a plurality of different types of electronic mail, a method of congruently categorizing mail and data files comprising the steps of:

providing a plurality of directories in the user communications device, each directory accessible by at least one of the plural application programs and storing data files of a preselect format;

receiving via the communications terminal one of the plurality of different types of electronic mail;

upon receipt of the received electronic mail, analyzing the received electronic mail; and directly storing the received electronic mail as a data file in a select one of the plurality of directories based upon the type of received electronic mail.

16. The method of claim 15, wherein the type of incoming electronic mail received at the user communications device is selected from the group consisting of fax, voice, E-mail, scenery, business card, MIME, HTML and attachment.

17. The method of claim 15, further comprising the steps of:

providing a default directory in the user communications device; and upon determining the type of received electronic mail as unidentifiable, storing the received electronic mail in the default directory.

18. The method of claim 15, wherein each of the plurality of different types of electronic mail has a unique format, and wherein the steps of analyzing and storing the received electronic mail comprises the steps of:

determining the format of the received electronic mail; and directly storing the received electronic mail as a data file in a select one of the plurality of directories based upon the format of the received electronic mail.

19. The method of claim 18, wherein the electronic mail stored as the data file in the select directory is accessible by select application programs using appropriate formatted data files.

20. The method of claim 15, further comprising the step of providing an edit module including cut, copy and paste editing features permitting a user to copy or move stored data files to different directories.

21. The method of claim 15, wherein the communications terminal is adapted to initiate voice communications, said method further comprising the steps of:

providing a phone module operated by the processor for making and receiving voice phone calls via the communications terminal, the phone module keeping a log of all voice phone calls made by a user, permitting the user to record the voice phone call in the user communications device, and generating an identifier associated with the log indicating that the voice phone call has been recorded.

22. The method of claim 21, wherein the step of keeping a log of all voice phone calls made by the user includes the step of providing a history list viewable on the display, the history list including a name and a number associated with each voice phone call made by the user.

23. The method of claim 22, wherein the step of generating an identifier indicating that the voice phone call has been recorded comprises the step of providing a notification icon in the history list that the particular voice phone call has been recorded.

24. The method of claim 21, wherein the phone module further:

permits a user to take text notes via the user input device during the voice phone call; and generates an identifier indicating that text notes were taken during the voice phone call.

* * * * *